April 9, 1968
H. DENNER
3,377,565
VARIABLE HIGH-FREQUENCY TRANSFORMER
Filed Dec. 23, 1966
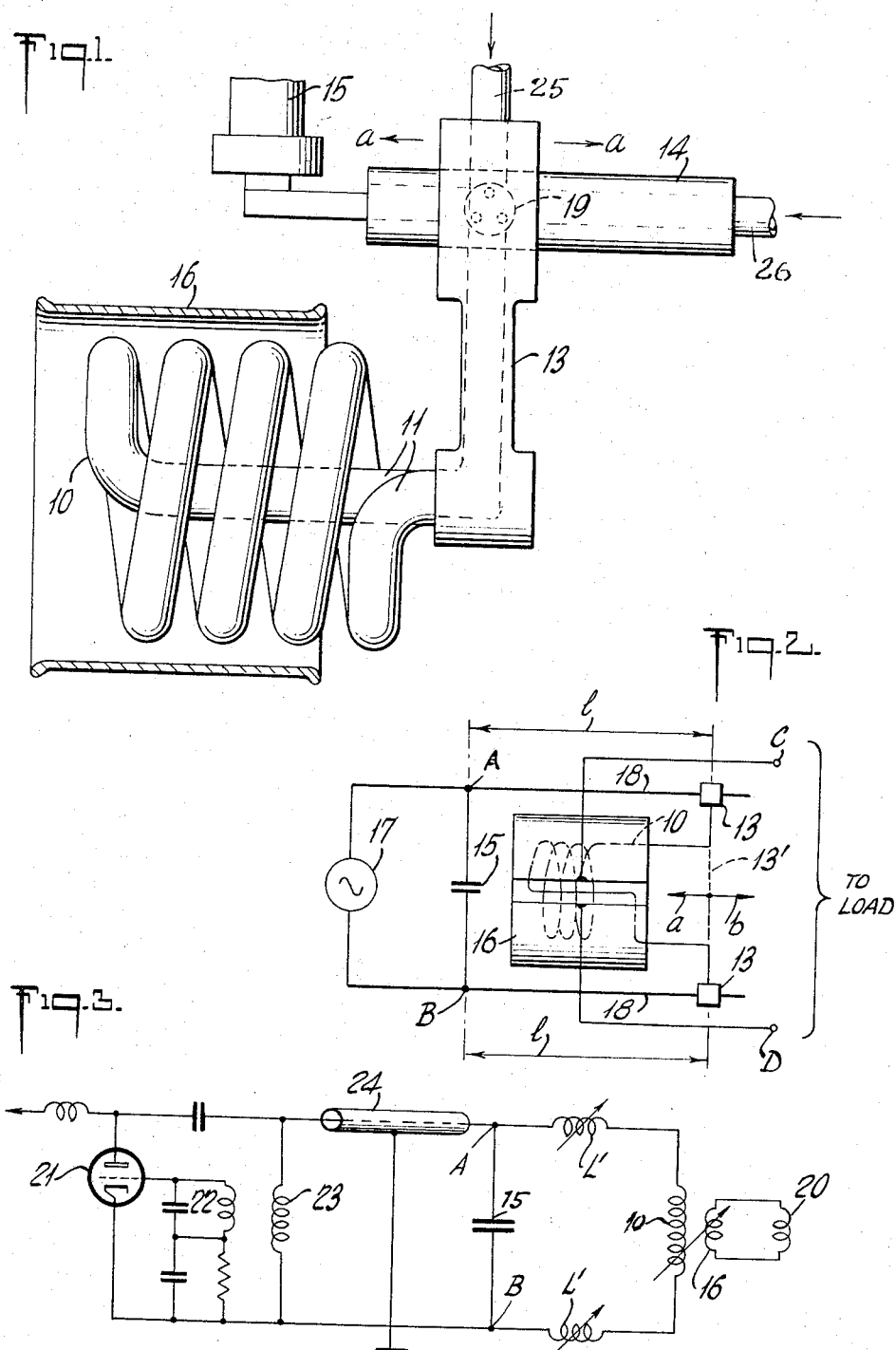
INVENTOR
HELMUT DENNER
BY KARL RATH
ATTORNEY

United States Patent Office 3,377,565
Patented Apr. 9, 1968

3,377,565
VARIABLE HIGH-FREQUENCY TRANSFORMER
Helmut Denner, Gebenstorf, Switzerland, assignor to "Patelhold" Patentverwertungs- & Electro-Holding AG, Glarus, Switzerland
Filed Dec. 23, 1966, Ser. No. 604,412
Claims priority, application Switzerland, Dec. 24, 1965, 17,820/65
10 Claims. (Cl. 331—74)

The present invention relates to high frequency transformers of the type having a first stationary winding and a second winding movable relative to said first winding, to control the mutual coupling between said windings and in turn the power transmission by the transformer.

Without being limited thereto, the invention is more specifically concerned with high frequency power transformers having a relatively high-ohmic primary winding and a low-ohmic secondary winding, the latter serving to feed an inductive or the like low-resistive load, such as a high frequency furnace or the like inductive heating device. Transformers of this type are advantageously comprised of a pair of concentric coils or windings with the secondary winding, which may consist of a single turn of hollow cylindrical cross-section, being stationary and connected to the load and with the primary winding or coil being concentric with the secondary winding and arranged for axial displacement into and out of said secondary winding for control of the power transmission between a source or generator and the load connected thereto.

In the case of high power high frequency loads, such as in the operation of melting furnaces or the like high frequency heating devices, cooling of the transformer coils becomes a necessity, such as by passing a water stream through the hollow coil windings or turns. In order to apply, in the example mentioned, both the coolant and electric current to the winding or windings, it is customary to employ flexible water-cooled high frequency cables as connecting means between the coils and the generator or other high frequency devices of a circuit and, in order, furthermore, to reduce the undesirable series or lead inductance of such cables, it is necessary to keep the length of the cables at a minimum and to reduce as much as possible the radius or radii of curvature of the cables. This, in turn, is bound to interfere with the proper cooling of some points or sections of the cables with the result that the cables may be overloaded and burned out after a relatively short operating time or period. In practice, the lead inductance, in the case of relatively high frequencies and high powers being transmitted, has been found to assume values as high as from 20% to 30% of the coil inductance, whereby to in turn result in considerable reactive power losses of the transformer. Another disadvantage of cable or the like flexible connectors is the fact that the lead inductance cannot be predicted with sufficient accuracy as desired or required in the design of transformers of the type described herein.

Accordingly, an important object of the present invention is the provision of a variable high frequency power transformer of the referred to type by which the aforementioned and related defects and difficulties are eliminated or minimized.

Among the more specific objects of the invention is the provision of an improved high frequency power transformer of the referred to type, wherein the series or lead inductance of the movable transformer winding has a predetermined and well defined value for any of the adjusting positions of the transformer; in which the series or lead inductance varies according to a predetermined relationship to the power being transmitted by the transformer; in which the series or lead inductance decreases in proportion to the power transmission by the transformer; and which will enable of efficient cooling of the movable transformer winding.

Another object of the invention is the incorporation of a variable transformer of this type in a self-excited oscillator with the movable or primary winding of the transformer forming an effective tuning inductance determinative of the oscillating frequency and with the secondary or stationary winding feeding a load or consuming device, in such a manner as to vary the oscillating frequency in proportion to the power transmission by the transformer.

A more specific object of the invention is the provision of a self-excited feedback oscillator operably embodying a variable power transformer according to the invention as a frequency determining element of the oscillator, whereby the oscillating frequency increases in proportion to the power transmission by the transformer from the oscillator and a load or consuming device.

Yet another object is the provision of a self-excited oscillator operably including a variable power transformer according to the invention as a frequency determining element of the oscillator, whereby the range of control or efficiency of the oscillator increases in proportion to increasing load or power transmission by the transformer from said oscillator to a load or consuming device.

The invention, both as to the foregoing and ancillary objects, as well as novel aspects thereof, will be better understood from the following detailed description, taken in conjunction with the accompanying drawing forming part of this specification and in which:

FIG. 1 is an elevational view, shown partly in section, of a variable high frequency power transformer constructed in accordance with the principles of the invention;

FIG. 2 is a combined diagrammatic view and circuit diagram showing a transformer according to the invention as an integral tuning element of a resonant coupling circuit; and FIG. 3 is an equivalent circuit diagram of a self-excited high frequency oscillator operably including a variable power transformer according to the invention, to control the efficiency of the oscillator in proportion to the power or load current supplied thereby.

Like reference numerals denote like parts in the different views of the drawing.

With the foregoing objects in view, the invention, according to one of its aspects, involves generally the provision in a high frequency circuit of a variable power transformer, to control the power transmission through said circuit, said transformer comprising a first stationary cylindrical winding or coil and a second movable cylindrical winding or coil concentric with and axially displaceable relative to said first winding, to control the mutual coupling between said windings and to in turn vary the high frequency power transmission by the transformer. Where a low-resistive load, such as an inductive heating device or the like, is to be supplied by the transformer from a high frequency source, such as an electron tube or equivalent oscillator, the stationary winding consisting of a few or a single winding turn advantageously forms the transformer secondary, while the movable winding forms the primary winding of the transformer connected to the power source.

There is provided, in accordance with the present invention combined terminal and power control means for said movable transformer winding comprising a pair of stationary parallel and electrically conducting terminal rails or the like elongated members parallel to the axis of the transformer windings and a pair of conducting supporting members each rigidly connected to an end of the movable winding and arranged for slidably adjustable engagement with one of said rails in mechanical as well as electrical contact therewith. One pair of adjoining ends of the rails, or the like elongated terminal members, serve as terminal means of the coil, whereby to enable a variable power transmission by the transformer by sliding and adjustment of said members upon and along said rails and resultant variation of the mutual coverage or overlap of the windings.

In an arrangement of the foregoing type, a definite or predetermined lead inductance presented by said rails obtains coordinated to any of the adjusting positions of or power transmission by the transformer. Preferably, a predetermined adjoining end pair of the rails are utilized as connecting terminals of the transformer winding, whereby to cause the lead inductance of the rails in series with said winding to decrease in proportion to increasing power transmission by the transformer, to reduce losses, in a manner as will become further apparent as the description proceeds.

If the movable winding forms an effective tuning element of a resonant circuit, such as the oscillatory circuit of a self-excited oscillator, a transformer of the type according to the invention may be advantageously utilized to increase the oscillating efficiency in proportion to an increase of the power generated and transmitted, for the purpose as will be further understood from the description in reference to the drawing.

Referring to the latter, the same shows a side view of a high frequency transformer constructed according to the invention and comprising a first movable coil or winding 10 the ends of which are rigidly connected to a pair of electrically conducting supporting members 13 which are in turn relatively slidably mounted on or supported by a pair of stationary spaced and elongated terminal members or rails 14 being parallel to the axis of the coil 10. Rails 14 serve as connecting terminal means of the coil 10 for connecting the same to a part or element 15 of a high frequency circuit or device, such as a capacitor as more clearly shown in FIG. 2. Numeral 16 represents a second stationary coil or winding of the transformer being concentric with the coil 10 and shown to comprise a single winding turn of split-cylindrical cross-section. If desired, coil 16 may be of multi-turn construction similar to coil 10, to suit existing operating conditions or requirements.

As shown more clearly by FIG. 2, coil 10, forming the transformer primary, may be connected to a relatively high-impedance high frequency power source or generator 17 and coil 16, forming the transformer secondary, may serve to feed a low-resistance load or consumer, such as an inductive furnace or the like high frequency device 20, FIG. 3.

In an arrangement of the afore-described type, with the source 17 connected to the left-hand ends of the rails 14, FIG. 2, or end pair adjoining the transformer 10, 16, and with the coil 10 inserted into the cylinder 16 for maximum coupling or power transmission by the transformer as shown, the lead inductances in series with the winding 10 presented by the parts 18 of the rails 14 are at a minimum due to the minimum distance 1 between the sliding members 13 and the terminal points A and B of the capacitor or the like circuit element to which the transformer is connected. As a consequence, there will be a minimum of power loss as a result of the reactive power expended by the lead inductances, especially during high or full load operation of the transformer.

Where, in the example illustrated, the primary coil 10 fed by the high frequency generator 17 is shunted by a capacitor 15, as shown in FIG. 2, the normal resonant frequency of the resulting tuned circuit 10, 15, that is, the frequency during idling or relatively low loads of the generator, is advantageously somewhat below the generator frequency in an effort to improve the transmission efficiency as the load current is increased, to further reduce losses of both the generator and transformer.

According to a further modification or use of a transformer according to the invention, a self-excited feedback oscillator operably embodying the primary 10 of the transformer is utilized to increase the oscillating frequency in proportion to increasing load current or power transmission by the transformer, in an effort to improve the oscillator efficiency as the load is increased. As a consequence, the current and losses during idling and low loads are less than under load or operating conditions.

Numeral 13' in FIG. 2 denotes suitable common operating means to displace both members 13 in unison for the control of the coil 10, as indicated by the arrows a and b.

In order to ensure an intimate contact between the rails or members 14 and members 3, FIG. 1, to prevent sparking or arcing, the members may be fitted with suitable sliding contacts in the form of one or more contact spring as indicated at 19 in the drawing.

The variation of the frequency in dependence upon the load current may be utilized advantageously and in a most simple manner to achieve an optimum control of or to utilize the full drive or control range of the tube or equivalent feedback amplifier at full or maximum load, substantially without overloading the grid of the tube during low load or idling operation. For this purpose, the resonant circuit comprised of the transformer input winding 10 and capacitor 15, FIG. 3, acts as the plate or output circuit of a double-tuned feedback oscillator 21 further including a tuned input or grid circuit 22 coupled with the circuit 10, 15 through a feedback coil 23 or in any other suitable manner. In the drawing, the resonant circuit 10, 15 is shown coupled with the coil 23 through a coaxial conductor 24.

In an arrangement of the afore-described type, the grid circuit is designed to have a resonant frequency being in excess of the highest operating frequency of the oscillator, whereby to result in an increasing efficiency or control of the oscillator as the load or power transmitted by the transformer is increased.

In order to dissipate the heat generated in the winding 10, the latter advantageously consists of a spirally wound hollow tube as shown which communicates with internal passages in the members 3, as indicated in dashed lines in the drawing, to maintain a stream of cooling medium (water, etc.) through the winding applied through suitable inlets 25. The same applies to the rails 14 which may be cooled in a similar manner.

In the foregoing the invention has been described in reference to a specific illustrative device. It will be evident, however, that variations and modifications, as well as the substitution of equivalent parts or elements for those shown herein for illustration may be made without departing from the broader scope and spirit of the invention as defined by the appended claims. The specification and drawing are accordingly to be regarded in an illustrative rather than in a restrictive sense.

I claim:
1. In a high frequency circuit, a variable transformer for controlling the power transmission through said circuit comprising in combination:
 (1) a stationary winding,
 (2) a movable winding concentric with said first winding, and
 (3) means for controlling the power transmission by said transformer being comprised of
  (a) connecting terminal means for said movable winding constituted by a pair of stationary spaced and electrically conducting rails parallel to the axis of said windings,
  (b) a pair of conducting supporting members each rigidly connected to an end of said movable winding, and
  (c) means to slidably and adjustably mount said members each in mechanical and electrical contact engagement with one of said rails.
2. In a high frequency transformer as claimed in claim 1, said rails connected to said circuit at predetermined ends thereof, to result in a decrease of the lead inductance of the rails in series with said movable winding in proportion to increasing power transmission by said transformer.

3. In a high frequency transformer as claimed in claim 1, said movable winding consisting of a spirally wound tube and said members including passages communicating with said tube for passing a cooling medium through said winding.

4. In a high frequency circuit including a high frequency source, a low-ohmic load and a variable power transformer connecting said source with said load, said transformer comprising in combination:
  (1) a stationary single-turn secondary winding having a split-cylindrical cross-section and connected to said load,
  (2) a cylindrical multi-turn primary winding concentric with said secondary winding, and
  (3) control means for said primary winding comprised of
    (a) connecting terminal means for said primary winding constituted by a pair of stationary spaced conducting rails having one end pair thereof connected to said source,
    (b) a pair of conducting supporting members each rigidly connected to an end of said primary winding, and
    (c) means to slidably and adjustably mount each of said members in mechanical and electrical contact connection with one of said rails.

5. In a high frequency circuit as claimed in claim 4, said source being connected to a predetermined end pair of said rails, to result in a decrease of the lead inductance of said rails in series with said primary winding in proportion to increasing power transmission by said transformer.

6. In a high frequency circuit as claimed in claim 4, including a capacitor shunted across the ends of said rails connected to said source, to form tuned circuit with said primary winding, said capacitor and source being connected to a predetermined end pair of said rails, to result in a decrease of the lead inductance of said rails in series with said primary winding in proportion to increasing power transmission by said transformer, and the frequency of said source exceeding the resonant frequency of said tuned circuit for relatively low power transmission by said transformer.

7. In a high frequency circuit as claimed in claim 4, said source consisting of a self-excited feedback oscillator having a tuned output circuit determinative of the oscillating frequency and including said primary winding as an effective tuning element, and said primary winding connected to a predetermined end pair of said rails, to result in a decrease of the lead inductance of said rails in series with said winding and to in turn increase the oscillating frequency in proportion to increasing power transmission by said transformer.

8. In a high frequency circuit as claimed in claim 4, said source consisting of a self-excited feedback oscillator having a tuned input and a tuned output circuit, said output circuit including said primary winding as an effective tuning element, said primary winding being connected to a predetermined end pair of said rails, to result in a decrease of the lead inductance of said rails in series with said winding in proportion to increasing power transmission by said transformer, and said input circuit having a resonant frequency in excess of the resonant frequency of said output circuit for relatively low power transmission by said transformer.

9. A variable high frequency power transformer comprising in combination:
  (1) a first cylindrical stationary winding,
  (2) a second cylindrical movable winding concentric with said first winding,
  (3) connecting terminal means for said second winding constituted by a pair of stationary spaced and electrically conducting elongated members parallel to the axis of said windings,
  (4) a pair of conducting supporting members each rigidly connected to an end of said second winding, and
  (5) means to slidably and adjustably mount said members each in mechanical and electrical contact engagement with one of said rails.

10. In a high frequency transformer as claimed in claim 9, said first winding comprised of a single turn of split-cylindrical cross-section.

References Cited
UNITED STATES PATENTS

| | | | |
|---|---|---|---|
| 2,662,162 | 12/1953 | Blok | 336—129 |
| 2,681,438 | 6/1954 | Anderson | 336—129 |

JOHN KOMINSKI, *Primary Examiner.*